Oct. 9, 1945.  M. G. McGOWAN  2,386,624
TEACHING DEVICE
Filed July 13, 1944  2 Sheets-Sheet 1

Inventor

MARY GERTRUDE McGOWAN,

By Clarence A. O'Brien
and Harvey B. Jacobson
Attorneys

Oct. 9, 1945. M. G. McGOWAN 2,386,624
TEACHING DEVICE
Filed July 13, 1944 2 Sheets-Sheet 2

Mary Gertrude McGowan,
By Clarence A. O'Brien
and Harvey B. Jacobson
Attorneys

Patented Oct. 9, 1945

2,386,624

UNITED STATES PATENT OFFICE 2,386,624

TEACHING DEVICE

Mary Gertrude McGowan, Fall River, Mass.

Original application July 1, 1943, Serial No. 493,095. Divided and this application July 13, 1944, Serial No. 544,687

2 Claims. (Cl. 35—1)

The present invention relates to a device for use in teaching fundamental facts and the like relative to music, art, arithmetic, English, history, geography, reading, etc., and the present application is a division of my co-pending application for patent upon means for teaching time, Serial No. 493,095, filed July 1, 1943, and allowed January 4, 1944.

An object of the invention is to provide a simple and economical device which is adaptable either to individual or group teaching, and by means of which the facts and the like are clearly displayed.

More particularly, the invention has to do with a holder for reception of a plurality of selectively usable charts on which the symbols are clearly visible, and wherein a pointer or hand is manually movable over a dial to facilitate drilling on the selected subject and to sustain attention during the drilling.

Stated with great particularity, the invention, in its preferred embodiment, is characterized by a chart-holding device including a frame forming a sight, the frame defining a pocket or receptacle for the chart, a crank-operated axle, and a hand or pointer on said axle properly located to coact with symbols on the dial portion of the chart.

Other objects and features of the invention will become apparent from the following description when considered in connection with the accompanying drawings.

In the drawings, wherein like reference characters indicate corresponding parts throughout the several views:

Figure 7 is an elevational view of a slightly different or modified type of chart, this being adaptable for use in the class room for drills in relation to fundamental facts in connection with arithmetic or drills for fractional and decimal equivalents and the like.

Figures 3, 4:
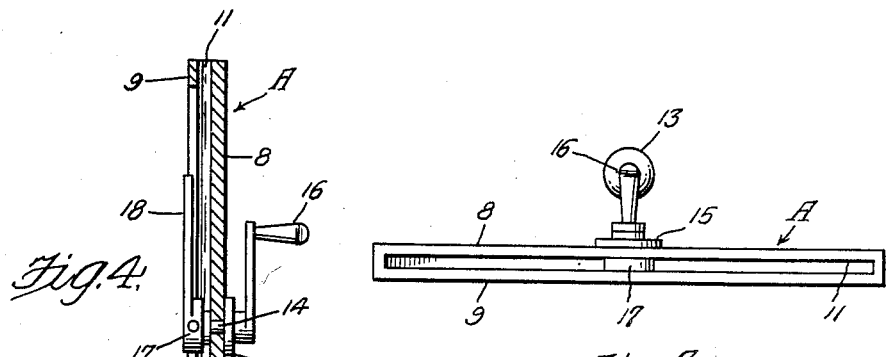
Figure 3 is an enlarged top plan view of the holder shown in Figure 2.
Figure 4 is an enlarged central vertical section taken substantially on the plane of line 4—4 of Figure 2.
Figure 5:
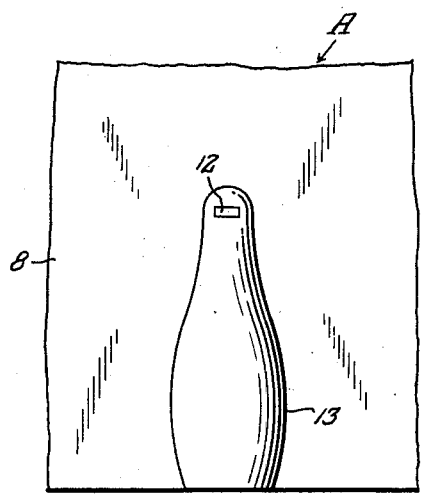
Figure 5 is a fragmentary enlarged rear elevational view, showing the handle part of the chart holder.
Figure 6:
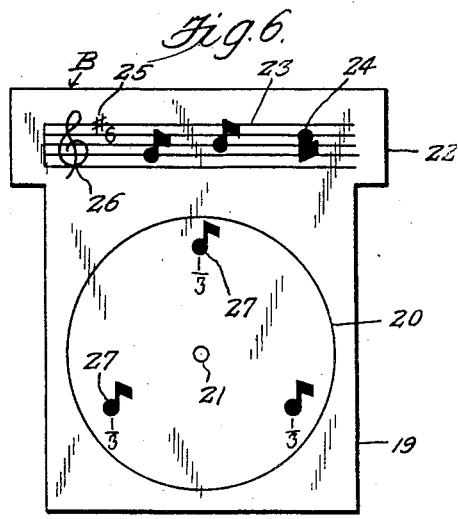
Figure 6 is a detail elevational view of one of the charts per se removed from the holder, this being the same chart which is seen in the holder in Figure 1.

The present invention consists of a holding device A for an insertable and removable cardboard or equivalent chart B. The holder A is constructed of suitable material and is of appropriate size. In its preferred form, it comprises a backing element 8 and a spaced parallel frame 9 of rectangular form. The frame defines a sight opening and also a pocket-like receiving channel 10 to accommodate the panel portion of selectively usable charts B. It will be noticed that the channel is closed at the bottom and along the two vertical edges and it is open at the top to form an entrance slot, as at 11, for the chart. On the rear of the backing element 8 is a suitable bracket 12 provided with a handle 13. This serves as a handle for holding the device, as a unit. It also cooperates with the part A as a support or rest. This is brought out clearly in Figure 4 of the drawings. The central portion of the backing plate or element 8 is provided with an aperture to accommodate the journal portion of an axle 14. This is provided with a washer 15 abutting the backing plate and also provided outwardly of the washer with a crank handle 16. The hub portion 17 of the pointer or indicating hand 18 is removably fitted over the axle so that the handle-equipped axle and the pointer can be separated to permit charts to be placed in position.

Structurally or fundamentally, the charts adapted to be used with the holder are all the same, the variations being in the particular symbols printed thereon. Each chart comprises a rectangular panel portion 19 having a circular ring 20 defining the clock dial or face. There is a central opening at 21 to slip the axle through, and an enlarged head portion 22 is provided at the top of the panel which affords shoulders to rest upon the holder at opposite ends of the slot portion 11 of the frame. This is to dispose the head portion 22 in a position to be clearly visualized independent of the clock dial. The head portion 22 may be provided with a fractional portion of a standard staff, as indicated at 23, and may be equipped with a note or symbol 24 on the lines of the staff, a signature at 25, and a clef at 26. The equidistant symbols representing eighth notes are denoted by the numeral 27, and these are in the area forming the so-called clock dial or face 20.

With reference to teaching elements of music, it is noted that in first rhythm one tone receives one beat, the tone being sustained while hand 18 rotates in clockwise direction from 12 back to 12.

It will be noted both here and on the remaining charts that only the lower figure of the time signature is given, the reason being that the beat and the fractions thereof are to be emphasized and the number of beats in a measure is therefore of no consequence.

In third rhythm, three equal tones are sung to one beat, the first being sustained from 12 to 20 minutes past, the second from 20 minutes past to 20 minutes of, and the third from 20 minutes of back to 12.

It will be noted that the device visualizes time and is simple and easy of operation. Attention is secured and sustained by the movement of the clock hand and the device is adaptable either to individual or to group teaching. The arithmetic of the beat is clearly seen, and the notes are visible in normal positions on the staff, the amount of time given to each being clearly illustrated on the clock face. A new or a difficult rhythm can be isolated, drilled upon, and reincorporated in the original song or exercise, and the device may be used by teachers of instrumental music. The device may also be used with any music course or with any series of music readers. Storage of charts is provided for, and the device is adaptable to other uses in the class room.

Figures 1, 2:
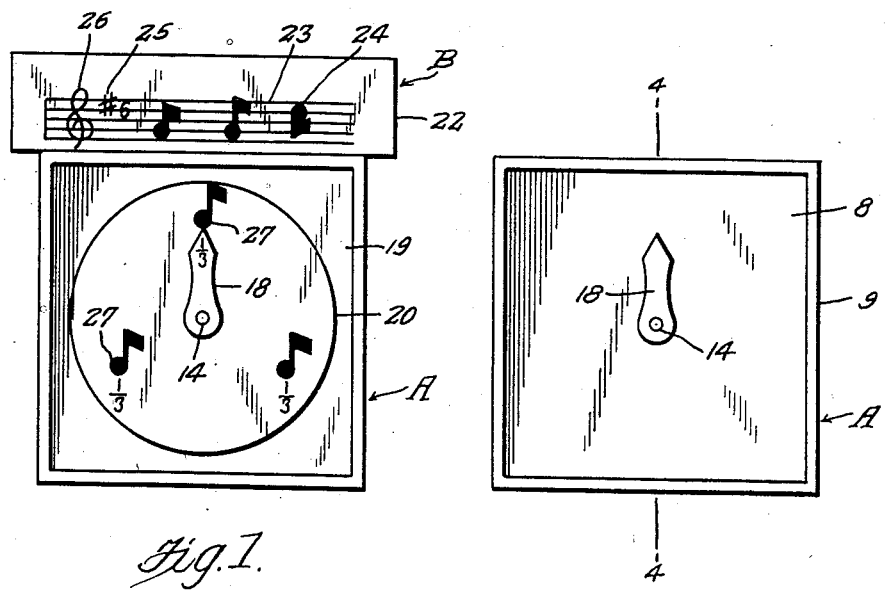
Figure 1 is a front elevational view of a holder supporting a chart and constructed in accordance with the present invention.
Figure 2 is a view of the holder with the chart removed.

In practice, the charts are placed in the frame portion of the holder, as shown in Figure 1. In this assemblage, the note symbols are visible in normal position on the staff 23 and the amount of time given to each are clearly illustrated on the clock face 20. The crank handle 16 is turned in a clockwise direction from one note to the other on the clock dial, whereby to visibly bring to view the results desired.

Figure 7:
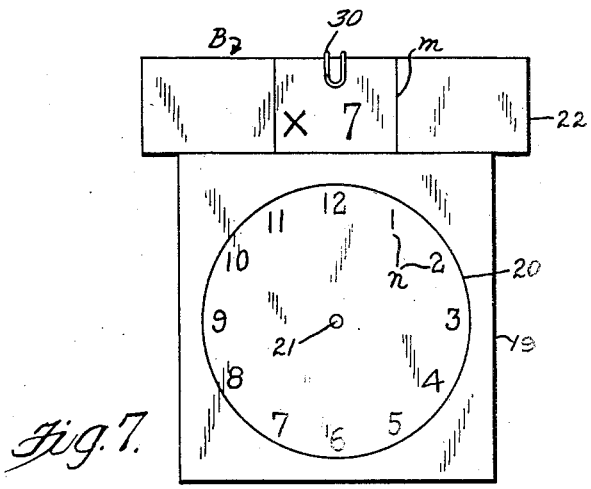

I have said that the device is adapted to other uses in the classroom, and it will be apparent that it may be used for drill on fundamental processes in arithmetic. Other charts can be made to fit the individual teacher's need. I shall describe only one, namely, multiplication by 7. The multiplier card $m$ is clipped at 30 to the top portion 22 of the chart as shown in Figure 7 and the clock hand or pointer 18 is swung at will to the various numbers $n$ on the clock face. The pupil's answer will be the product of these two factors. This makes it possible for the teacher to repeat easily and often a difficult combination. In this way the many facts involved in each of the four fundamental processes of addition, subtraction, multiplication and division can be drilled upon, the moving hand sustaining attention during drill.

It is thought that persons skilled in the art to which the invention relates will be able to obtain a clear understanding of the invention from the foregoing description when considered in connection with the drawings.

Minor changes may be made such as fall within the spirit and scope of the invention as claimed.

What I claim is:

1. In a teaching device of the class described, a holder comprising a rectangular backing board, a rectangular front frame parallel with and spaced from said backing board, and narrow side and bottom walls connecting the backing board and frame to define a flat vertical receptacle open at the top for removable reception of centrally apertured selectively usable charts, an axle removably journaled for rotation in and extending through said backing board centrally of the latter, a crank secured on said axle rearwardly of said backing board, and a pointer mounted on said axle in front of said backing board and movable within the limits of the frame, said pointer being removable from the axle to permit engagement of the latter in the aperture of a chart inserted in the holder, said axle being removable to permit insertion of the chart in the holder preparatory to engagement of the axle in the aperture of the chart and mounting of the pointer on the axle in front of the chart.

2. The construction defined in claim 1, in combination with a bracket secured on the back of said backing board below said axle and having a horizontal rearwardly projecting arm, and a handle fixed to the rear end of and depending from the bracket arm parallel with the backing member, the bottom of the handle being level with the bottom of the holder so that the handle serves as a prop to support the holder in a vertical position on a horizontal supporting surface.

MARY GERTRUDE McGOWAN.